Oct. 17, 1939. H. G. LOMBARD 2,176,405
FASTENING MEANS FOR CABLES OR THE LIKE
Original Filed Dec. 8, 1936
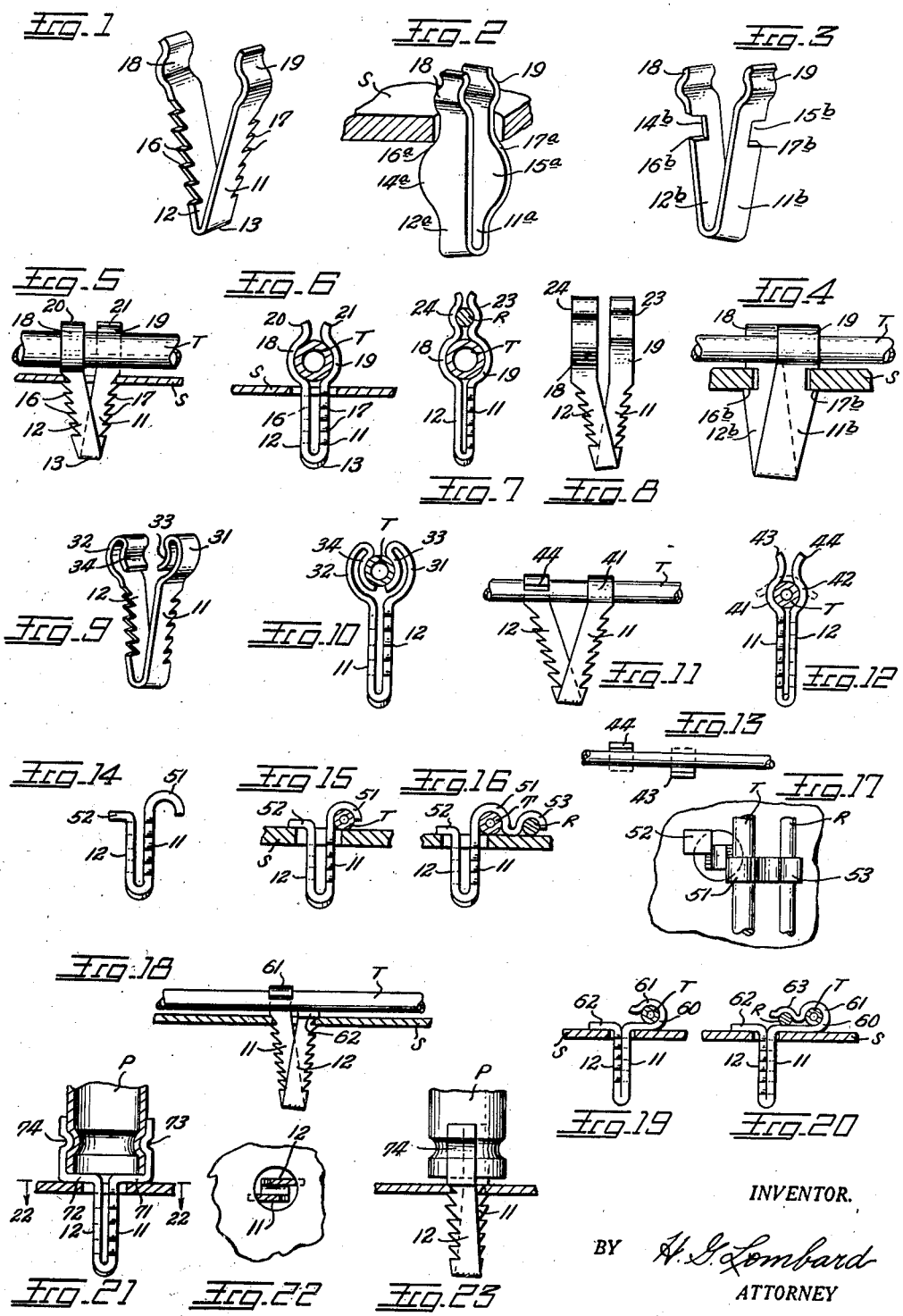
INVENTOR.
BY H. G. Lombard
ATTORNEY Patented Oct. 17, 1939

2,176,405

UNITED STATES PATENT OFFICE 2,176,405

FASTENING MEANS FOR CABLES OR THE LIKE

Herman G. Lombard, Washington, D. C., assignor to Albert H. Tinnerman, Cleveland, Ohio Original application December 8, 1936, Serial No. 114,825, now Patent No. 2,077,120, dated April 13, 1937. Divided and this application April 8, 1937, Serial No. 135,799

2 Claims. (Cl. 24—73)

This invention relates to fastening means for mounting cables, conduits, electrical conductors, tubes, posts, and the like, in place upon a support.

This application is a division of a prior co-pending application entitled Fastening means, Serial No. 114,825, filed December 8, 1936, since issued as Patent Number 2,077,120, April 13, 1937.

More particularly, the invention is directed to fastening devices constructed from relatively thin material of sheet or strip form, such as sheet spring steel, sheet metal, cold rolled metal, flattened wire and the like and designed for use in combination with conduits, cables, or the like for supporting the same in applied position on a support without danger of loosening or becoming accidentally removed incident to vibration, jarring and strain which may take place in the supporting member.

The fastening means of this invention comprise various forms of clip devices having head sections designed for frictionally and grippingly engaging a cable or the like and shank members comprising relatively yieldable leg elements or shank sections which are offset, or out of line in normal, untensioned relation to be placed under tension on being advanced to holding position in an aperture in a support.

The devices may be constructed from metal sheet material of suitable thickness, such as strip stock or blank stampings from relatively wide stock; in the forming operation the devices are so constructed as to provide various types of shank structures each comprising relatively yieldable leg elements or shank sections integrally united to form a leading end, the head structures being constructed from the free ends of the shank sections and deformed for cooperation with a conduit, cable, or the like.

In any form of fastening device in which there is obtained a yieldable relation of the shank sections or leg elements, an effective fastening means is provided in that on applying such a device to work in an aperture of less width or diameter than the spacing or overall width of the shank sections, a tension is set up in such shank sections, which tension provides a friction, press fit of the devices in fastening position.

Heretofore, such fastening devices have been used somewhat satisfactorily in applications where no great degree of movement or vibration takes place in the work or members fastened or supported. However, where any degree of strain, jarring or vibration takes place, the shanks of such types of fasteners tend to loosen from their fastening position and eventually become completely removed due to the fact that the sections or elements comprising the shank do not possess sufficient inherent holding power and ability under such conditions.

This invention therefore contemplates the provision of supporting means for conduits, cables, or the like comprising fastening devices in which the shanks are composed of relatively yieldable shank elements or leg sections so disposed with respect to each other as to permit quick, easy insertion of the devices into an aperture in a support by flexing and relative yielding thereof, yet when in fastening position, have such a degree of stiffness rigidity and tension stored therein through contact and compression against the side-walls of the aperture, that a tension is set up in the shank sections whereby substantial resistance is offered to withdrawal of the devices and extraordinary resistance is provided against loosening or tendency of the devices moving from applied position due to vibration, jarring, or strain in the supporting member.

It is a further object of the invention to provide supporting means for conduits, cables, and the like, comprising fastening devices in which the shank elements are readily insertable to tensioned relation in an aperture in a support and at the same time, the head sections, formed from the free ends of the shank elements, are caused to snugly grip and tightly embrace the supported member in desired position on the support.

Another object of the invention aims to provide supporting means for conduits, cables, and the like, embodying fastening devices designed for grippingly engaging a member to be supported and comprising relatively yieldable shank elements provided with integral, projecting or lug means such as shoulders, teeth or cam surfaces serving to lock under tension in applied position in an aperture in a support.

Further objects and advantages of the invention will be apparent to those skilled in the art as a description thereof proceeds with reference to the accompanying drawing in which like reference characters designate like parts throughout the same and in which:

Fig. 1 is a perspective of one form of the device showing the arrangement of the head sections for gripping a line, wire, cable, conduit, or the like.

Fig. 2 is a perspective of another form of the device as applied to fastening position in a support.

Fig. 3 is a perspective view of a still further form of the fastening means.

Fig. 4 shows in side elevation the device represented in Fig. 3 as applied to fastening position in a support for mounting a cable or the like, thereon.

Fig. 5 is a side elevation of a device such as represented in Fig. 1 showing the arrangement for mounting an object on a support.

Fig. 6 is an end view of Fig. 5.

Fig. 7 is an end view of a similar device in which the head sections are deformed for engaging and supporting a plurality of objects.

Fig. 8 shows in side elevation the device of Fig. 7.

Fig. 9 is a perspective of a device in which the free ends are designed to form a cradle for an object to be supported.

Fig. 10 is a side elevation of the device of Fig. 9 showing the arrangement of the cradle head sections for gripping an object to be supported.

Fig. 11 is a side elevation, Fig. 12 is an end elevation, and Fig. 13 is a top plan view of a construction in which the free ends of the fastening device are designed to engage an object and subsequently be deformed to lock the object in desired position.

Fig. 14 shows in end elevation another form of device in which the free end of one leg is designed to rest upon the support and the other end is designed to engage and support an object against the adjacent supporting surface.

Fig. 15 shows the device of Fig. 14 in applied position for mounting an object to an apertured support.

Fig. 16 shows in end elevation a similar device in which a head section is designed to engage and support a plurality of objects.

Fig. 17 is a top plan view of Fig. 16.

Fig. 18 is a side elevation of a form of the device wherein one end of the free ends is designed to rest upon a support and the other free end is bent back upon itself to form a clip means for mounting an object.

Fig. 19 is an end elevation of Fig. 18.

Fig. 20 is a similar view of a similar device for mounting a plurality of objects.

Fig. 21 is an end elevation of a device applied to fastening position in a support and in which the free ends are formed into arms having protuberances adapted to seat in a depression or recess in a post, tube, or the like.

Fig. 22 is a section taken along line 22—22 of Fig. 21.

Fig. 23 is a side elevation of Fig. 21.

In the constructions herein disclosed the fastening means of the combination comprise shank elements which in normal, untensioned relation are laterally offset with respect to each other or have the outer longitudinal edges thereof disposed in converging relation toward the leading end, such that, as the device is advanced in an aperture of less width or diameter than the overall width of the shank, a gradual, relative, lateral movement of the shank elements is effected to set up a tension therein. The head sections are formed from the free ends of the laterally movable shank elements and are suitably deformed for connection with a wire, cable, conduit or the like to be mounted on a support.

It will be seen that as a fastening device of the instant type is advanced into an aperture in a support, the shank elements are subjected to relative lateral movement to tensioned relation and at the same time the head sections are moved to such position as to frictionally and grippingly engage the object to be supported and rigidly mount the same on the support.

In the combination shown, the shanks of the securing devices may be constructed from a strip or blank of metal by bending the same back upon itself in a fold disposed at an angle such that the shank elements are laterally yieldable with respect to each other. On bending a strip to thus dispose the folds at an angle, the leg elements of the respective shanks must naturally lie offset with respect to each other in normal, untensioned relation. And since the degree of offset of the legs is determined by the angle of the fold, the disposition of the legs relative to each other in normal position may assume a laterally offset or other form of offset relation; this offset relation of the legs may be so designed as to be the most effective in an aperture of predetermined size in any desired location. Thus, on being applied to an aperture of smaller width or diameter than the distance between the outer longitudinal edges of the legs in their normal, untensioned laterally offset relation, the legs are caused to move laterally from their normal, offset relation to a position approaching alignment or approximate alignment. Such movement of the legs from their normal, untensioned, laterally offset relation is designed to set up an extraordinary tension in the legs, which tension is exerted against the adjacent walls of the aperture. In many instances the tension thus exerted is sufficient to maintain a device rigidly in fastening position in the work due to the unusual frictional engagement thus obtained against the side walls of the aperture. Where such frictional engagement alone is sufficient to maintain the shank in its applied position, the fastening device may be utilized as a means for removably mounting an object, if desired. On removing the shank from an aperture the shank legs naturally tend to assume their initial, normal, untensioned, offset relation such that the fastener may be reinserted in an aperture in the manner of a push or snap-stud and the object held thereby again mounted in the installation from which it was removed.

In many other instances, however, it is necessary or desirable that the mounting of an object be permanent, whereupon it is withdrawn from applied fastening position. In such instances, it is decidedly advantageous to employ on the legs of the shank some form of locking means to act in addition to the frictional engagement of the legs against the aperture side walls. Such locking means may be provided by recesses, shoulders, lugs, or series of teeth disposed on the legs, preferably along the longitudinal edges thereof such as to contact and engage the aperture side walls and adjacent underface of a support to lock in position under tension of the tensioned shank elements.

In the drawing, various uses and methods of application of the shank structures to a support in combination with conduits, cables and the like to be mounted thereon are disclosed. In every form it is to be noted that the anchoring of a fastening device is accomplished through the action of the relatively yieldable leg members and tooth elements thereon contacting and engaging the side-walls of the aperture and adjacent area of the support. However, it is to be understood that it is fully intended as within the scope of this invention that the free ends of the legs of any of the shank structures shown or described may be bent, distorted or suitably deformed to provide any of the head structures for connection to a finishing object as herein disclosed and for the purposes set forth. Likewise, it is intended as within the scope of this invention that any of the head structures shown for connecting a fastening device to an object may also be used and adapted for use as desired or expedient, on any form of shank structure herein disclosed, described, or similar thereto.

In Figs. 1-3 inclusive are shown various shank structures which may be incorporated in any of the fastening devices represented. Any form of device may be constructed from a strip or blank bent back upon itself to provide a shank comprising relatively yieldable leg elements integrally united to form a leading end for the device. Thus, in Fig. 1, the shank structures comprises the relatively yieldable leg elements 11, 12 integrally united as at 13 and provided with lug, shoulder or abutment means in the form of series of teeth 16, 17 whereby the device is adapted for locking engagement in apertures in supports of various thicknesses. In Fig. 2, the shank legs 11a, 12a are provided with cam surfaces 14a, 15a, presenting substantial cam shoulders 16a, 17a adapted to engage the lower corner edge of the aperture to retain the device in applied position. Since the respective cam shoulders engaging in the support present continuous work engaging edges this form of device is admirably suited for use in various thicknesses of material and also may be withdrawn from applied fastening position if desired. Fig. 3 shows a form of shank structure in which the offset, relatively yieldable legs 11b, 12b, are provided with recesses 14b, 15b presenting sharp, pronounced shoulders 16b, 17b whereby the device is especially adapted for use in a predetermined thickness of work. As shown in Fig. 4, when the device is seated in applied fastening position the shoulders 16b, 17b are designed to engage the lower corner edge of the aperture and the adjacent surrounding surface of the work to lock the device in applied position. Devices of this form by reason of the pronounced locking shoulders cannot be removed from applied fastening position without destroying or mutilating the fastening device.

For purposes of illustration, the shank structure of Fig. 1 is embodied with the specific forms of head structures herein disclosed. It is to be understood however, that this invention fully comprehends the use of the specific shank structures of either Fig. 2 or Fig. 3 with any of the specific head structures herein disclosed and designed to support or clamp a cable, tube, line, wire, rope, or the like, in any desired position on or relative to a supporting surface.

In Figs. 5 and 6, the free ends 18, 19 of shank legs 11, 12 are shown deformed to provide embracing members designed to support and clamp an object having a substantially round cross section such as, for example, a tube T. Preferably the extremities of the free ends are flared as at 20, 21, Fig. 6, to facilitate application of an object between the embracing members. As shown in Figs. 7 and 8, the free ends of the head sections may be extended to provide additional embracing members 23, 24 in order that the device may clamp a plurality of objects such as a tube T or a wire R.

Figs. 9 and 10 show a head structure formed from the free ends of the leg members such that a cradle mounting is provided for mounting an object in applied position on a support. In certain applications where much jarring and vibration takes place, the gripping elements or embracing members of the head sections have a tendency to rub the object supported and thus damage the same. In providing a cradle mounting, such objection is necessarily removed since the object supported may move in its cradle with the jarring and vibrations, yet be firmly held by the gripping elements in its original applied position. In Figs. 9 and 10 the cradle mounting comprises arcuate sections 31, 32 provided from the free ends of the leg members. The said arcuate sections are provided with arcuate return bends providing gripping elements 33, 34 which together form a cradle for supporting an object such as a tube T, Fig. 10.

Figs. 11-13 inclusive show a head structure wherein the gripping elements 41, 42 of the head sections have, initially, a substantially upright position, (Fig. 12) with the extremities flared as at 43, 44 such that an object may be readily applied thereto, whereupon the said extremities may be deformed to lock the object in its applied position as shown in dotted lines in Figs. 12 and 13 and full lines in Fig. 11.

Figs. 14 and 15 disclose a head structure wherein the free end of one of the shank legs is suitably deformed to provide an arm 51 to engage and support an object such as a tube T against the adjacent supporting surface. The free end of the other leg may be formed into a shoulder 52 to seat against the suporting surface and steady the device in its applied fastening position. As shown in Figs. 16 and 17 the arm 51 may be provided with an additional section or sections 53 such that the fastening device is adapted for supporting a plurality of objects.

Figs. 18-20 inclusive show a head structure provided by deforming the free end of one of the leg members back upon itself to provide relatively yieldable sections 60, 61 adapted to engage and support between them an object such as tube T, Figs. 18 and 19, the other free end being deformed as at 62 to rest upon the supporting surfaces and steady the device in applied fastening position. As shown in Fig. 20 the section 61 may be elongated to provide an additional section 63 to support a plurality of objects such as tube T and wire R.

Figs. 21-23 inclusive show a form of head structure adapted to receive and support a tube, post, or the like, in substantial axial alignment with the shank. Head sections 71, 72 formed from the free ends of the legs are provided with projecting lug elements or protuberances 73, 74 adapted to seat in a cooperating recess, depression, or groove in a hollow post P, tube, or the like, and retain the same in applied position.

To secure an object, such as a cable, or tube, a series of spaced holes are provided in the support in a path where it is desired that the tube shall extend. In certain applications the fastening devices may be placed upon the tube with the gripping elements thereof embracing the same. Since the leg members of each shank are integrally united in the leading end, the fasteners are thus readily seated in the holes in the support. As the devices are advanced to fastening position in the support, the respective leg members of each shank are subjected to a gradual, relative movement against the side walls of the aperture from their normal, untensioned laterally offset relation to tensioned relation in fastening position as, for example, shown in Fig. 22. This naturally causes a relative movement of the embracing members or head sections on the free ends of the legs into effective gripping engagement with the tube to rigidly mount the same upon the support.

In other applications the devices may be inserted in the holes in the support to fastening position under tension. An object such as a tube, cable, or the like, is then applied to the head sections or embracing members, the flared extremities of the head sections facilitating such entrance of the object between the embracing members.

While the invention has been described in detail with specific examples such examples are illustrative only, since other modifications within the spirit and scope of the invention will be apparent to those skilled in the art. Hence, the invention is to be understood as limited only as indicated in the appended claims in which the intent is to set forth all the novelty over the prior art.

What is claimed is:

1. A fastening device for mounting a cable or the like onto a support, said fastening device comprising a section of sheet metal having a bent portion providing a shank comprising a pair of leg members extending in the same general direction and integrally united to form a leading end for the device, said leg members being receivable in an aperture in said support and having head sections including resilient gripping elements, said gripping elements being disposed inwardly of and spaced from said head sections in substantially opposed relation and forming a substantially resiliently supported cradle for the cable or the like adapted to hold the same spaced from said head sections in mounted position on said support.

2. A fastening device for mounting a cable or the like onto a support, said fastening device comprising a section of sheet metal having a bent portion providing a shank comprising a pair of leg members extending in the same general direction and integrally united to form a leading end for the device, said leg members being receivable in an aperture in said support and having head sections, said head sections having return bends providing resilient gripping elements disposed inwardly thereof in substantially opposed relation, said gripping elements being spaced from said head sections and forming a substantially resiliently supported cradle for the cable or the like adapted to hold the same spaced from said head sections in mounted position on said support.

HERMAN G. LOMBARD.